Sept. 9, 1958  G. D. FORD ET AL  2,851,639
ELECTRICALLY-CONDUCTIVE CERAMIC FLOOR-TILE UNITS AND
FLOORS COMPOSED OF SUCH CONDUCTIVE UNITS
Filed March 27, 1952
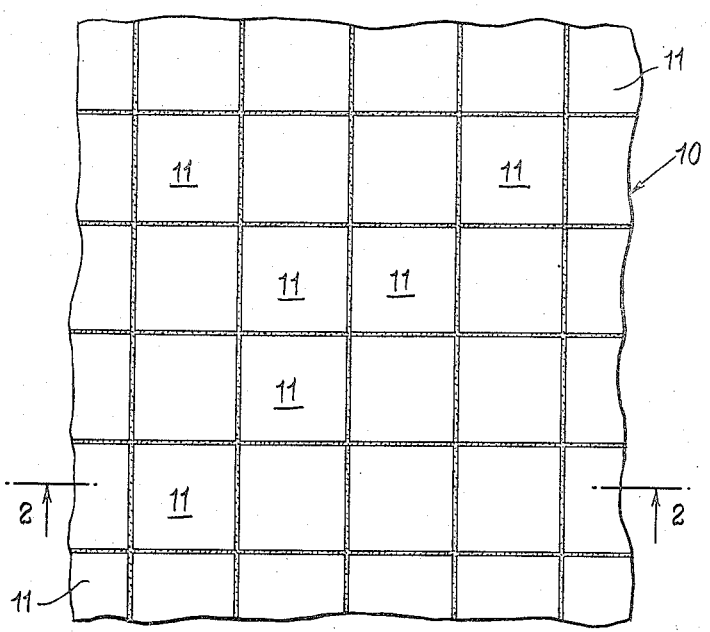
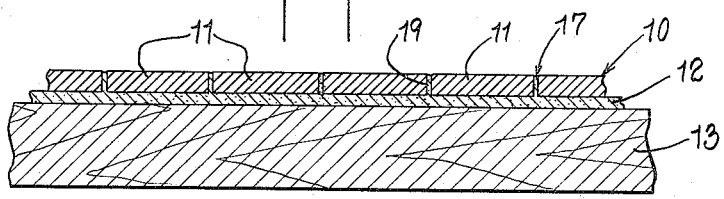
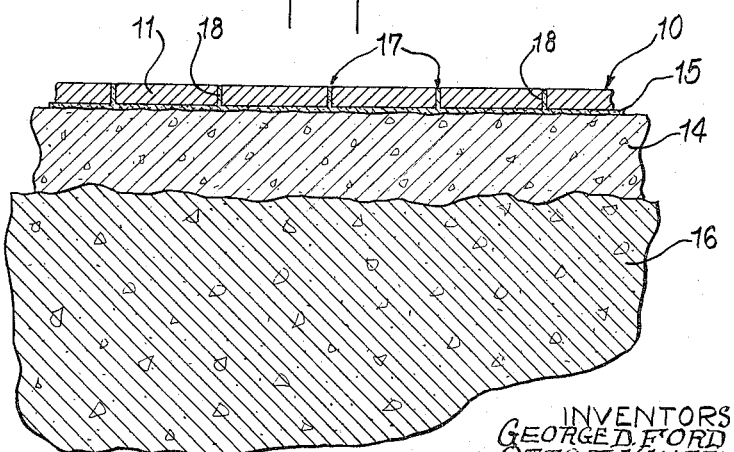
INVENTORS
GEORGE D. FORD AND
OTTO T. KAUFFMANN
BY
ATTORNEY

2,851,639

ELECTRICALLY-CONDUCTIVE CERAMIC FLOOR-TILE UNITS AND FLOORS COMPOSED OF SUCH CONDUCTIVE UNITS

George D. Ford, Zanesville, and Otto T. Kauffmann, South Zanesville, Ohio, assignors to The Mosaic Tile Company, Zanesville, Ohio, a corporation of Ohio Application March 27, 1952, Serial No. 278,882

9 Claims. (Cl. 317—2)

This invention relates to electrically-conductive ceramic floor-tile units and floors composed of such conductive units, and more particularly relates to conductive ceramic flooring tile units and floors composed of special earthen materials that are hardened by firing under a suitable temperature, and preferably under conventional firing temperatures between 2100° F. and 2400° F.

In the operating rooms of hospitals, electrostatic spark discharge is a hazard of great significance and frequently causes accidents with considerable property damage by the ignition of combustible materials necessarily used therein, and certain deaths occurring in such operating rooms have been attributed to explosions produced by discharges of such static electricity. Such static electricity also provides a hazard or cause of accidents in nuclear and electrical laboratories, and in other manufacturing laboratories and establishments.

One of the objects of this invention is to produce wear-resistant ceramic floor tile units of the type hereinabove specified and to enable production thereof by efficient tile-making methods which will cause such tile units to possess a controlled electrical conductivity in which the maximum resistance of the floor will be approximately 400,000 ohms and the minimum resistance of the floor will be 25,000 ohms. This controlled electrical conductivity is within the limits of 25,000 to 500,000 ohms specified by The National Fire Protection Association, and when tile units having this characteristic are embodied in a floor of a building, such floor will, because of said inherent property in the tile units, provide effective control of the electrical conductivity of the floor and will conduct out of the room in which such floor is laid any static electricity that may be generated. Such static electricity is usually, though not necessarily, conducted by applicants' floor to a grounding element embedded in or connected with our conductive floor. We thus cause such floors to be safe and proof against static electricity as well as the sparks therefrom.

Another object of this invention is to produce conductive tile flooring units that are sanitary, easily maintained and will have wear resistant qualities equal to conventional floor tile-units.

Another object of our invention is to utilize in our conductive ceramic tile units a conductive earthen material comprising ferrosoferric oxide ($Fe_3O_4$) that is plentiful in nature and inexpensive.

Still another object of our invention is to utilize in our said conductive ceramic tile units a quantity of said ferrosoferric oxide ($Fe_3O_4$) and to control in production the conductivity of the body of the tile units by the use of a proportionate quantity of this conductive earthen material in relation to other conventional ingredients, and we employ not less than a minimum proportionate amount of 25% (below which suitable conductivity will not be obtainable) and a maximum proportionate amount of between 50% to 60% of such ferrosoferric oxide ($Fe_3O_4$) in combination with suitable clays, and preferably with a suitable flux such as a spar; and in the preferred embodiment of our invention we employ 31% ferrosoferric oxide ($Fe_3O_4$) in combination with proper proportionate amounts of any suitable type of clays and a flux or spar material suitable for use in tile manufacture, and preferably we use potter's or stone ware clay comprising 46.6% and 22.4% of a suitable flux or spar known commercially as keystone spar, which is a conventional spar used in the manufacture of tile.

Another object of our invention is to produce tile units of the character specified which will have an imperviousness to water with an absorption factor of less than 1% which is critical because in tile units possessing an absorption factor of over 1% conductivity is lost; also to produce tile units which will be so impervious within conventional limit of .5% or less accepted by the ceramic tile-making industry and also will be as acid-resistant as the conventional ceramic tile unit.

Another object of our invention is to produce a conductive ceramic tile floor embodying ferrosoferric oxide ($Fe_3O_4$) combined with clay and preferably with a suitable flux such as a spar in the proportionate quantities hereinabove specified.

Another object of our invention is to produce a conductive ceramic tile floor comprising tile units composed of the materials hereinabove specified and preferably comprising tile units of the specific composition hereinabove specified.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:

Fig. 1 is a fragmentary plan view of section of floor composed of our conductive tile units;

Fig. 2 is a cross-section on the line 2—2 of Fig. 1 looking in the direction of the arrows, and showing said floor section formed of our conductive tile units set in a relatively thin underlayment or setting bed which has a required conductivity; and Fig. 3 is another cross-section on the line 2—2 of Fig. 1, looking in the direction of the arrows, and showing a floor section having our conductive tile units set in a mortar-setting bed also having the required conductivity.

Referring now to these drawings which illustrate a preferred embodiment of our invention, 10 indicates a fragmentary section or portion of a floor which is composed of a series of our electrically-conductive ceramic tile units 11, each embodying a suitable proportion of ferrosoferric oxide ($Fe_3O_4$). These tile units are produced by efficient and conventional tile-making methods, and are made to possess a controlled electrical conductivity and when properly installed as a tile floor will provide therein an electrical-conductivity between a minimum of 25,000 and a maximum of 400,000 ohms. Such controlled electrical-conductivity is within the limits of 25,000 to 500,000 ohms specified by the National Fire Protection Association. These conductive tile units 11 are wear resistant and the utilizing of such units in a tile floor 10 of a building will, because of the said inherent conductive property or characteristics in the tile units, produce such effective control of the conductivity in a floor composed of such units that any static electricity produced by frictional contact therewith or that may be brought on shoes or the like into a room in which said floor is laid will be rendered harmless because it will be immediately conducted out of the room and preferably to a suitable grounding element. Floors so formed will thus be suitable for use in the operating rooms of hospitals and in nuclear and electrical laboratories and in other manufacturing laboratories and establishments where static electricity provides a hazard or cause of accidents, and particularly in the operating rooms of hospitals where static electricity frequently causes accidents with considerable property damage by igniting combustible materials necessarily used therein. Certain deaths occurring in these operating rooms have been attributed to explosions produced by discharge of such static electricity. By providing in such rooms a tile floor composed of applicants' tile units, such accidents may in the future be avoided.

These tile floors, in embodiments of our invention, comprise electrically-conductive ceramic tile units each composed of a combination of conventional ceramic materials such as clays and a suitable flux, preferably comprising a spar. The spar preferably employed by the applicants is a feldspar comprising a combination of what is conventionally called microcline with anorthoclase and is a mixture of these two types of feldspar. Such a spar is combined with a quantity amounting to at least 29% of the tile body, of ferrosoferric oxide ($Fe_3O_4$), an electrically-conductive earthen material which is capable of use in a ceramic tile floor and that is plentiful in nature and relatively inexpensive. We have found that a quantity of less than said 25% of ferrosoferric oxide ($Fe_3O_4$) does not produce in such tile units or in floors made therewith a satisfactory degree of electrical conductivity.

In production of our tile, we control the electrical conductivity of the body of the tile units by the use of a suitable proportionate quantiy of this electrically-conductive earthen material in combination with other conventional ingredients, such as potter's clay and a suitable flux, such as a spar, and in the preferred embodiment of our invention, we employ a quantiy of ferrosoferric oxide ($Fe_3O_4$) amounting to 31% in combination with proper proportionate amounts of potter's clay and a spar that is suitable for use in tile manufacture, and preferably we employ in these conductive tile units 46.6% of potter's clay (comprising 46.6% of potter's or stoneware clay together with 22.4% of a suitable standard commercially-known spar). These clay and spar materials are conventional materials used in the manufacture of ceramic tile. The proportionate amount of ferrosoferric oxide ($Fe_3O_4$) so employed is thus over or more than the critical minimum proportionate amount of 29% of such material (below which a suitable degree of electrical conductivity will not be obtained).

Our electrically-conductive tile units of the composition hereinabove stated will also have an imperviousness to water with an obsorption factor or less than 1% which is also critical because in tile units possessing an absorption factor of over 1% electrical-conductivity is lost, and in the preferred embodiment of our invention hereinabove referred to, we produce tile units which will be impervious within a limit of .5% or less which is accepted as satisfactory by the ceramic tile-making industry, and our said electrically-conductive tile units will thus have a degree or percentage of acid-resistance as great as tile units made of conventional ceramic tile-making material.

Furthermore, a flooring formed of our tile units will have wear-resistant qualities equal to floors of conventional ceramic floor tile-units, and when the tile units embodying said ferrosoferric oxide ($Fe_3O_4$) with its electrically-conductive characteristics are embodied in the floor of a building, such floor will, because of the inherent characteristic of the tile units, provide effective control of the electrical conductivity of the floor and will conduct out of the room in which such floor is laid any static electricity that may be generated therein because of the frictional contact of shoes of men and women passing thereover, and also the frictional contact of other devices that may be dragged or rolled over said floor surface or that may be brought into the operating room from other rooms on the shoes of such men and women or on the contacting portions of such other devices.

Such static electricity is usually conducted by applicants' flooring to an underlayment or tile bed 12 comprising, as shown in Fig. 2, a special type of bedding material that is also electrically-conductive to a certain degree, it being understood that when our tile floor is laid on such a bed of electrically-conductive material, the charge of static will pass through the tile floor and into this underlayment or bed 12 and that either said floor or its electrically-conductive bed may be connected up in any suitable conventional manner to an electrical grounding element, not shown. The optimum thickness of the bed of an electrically-conductive material such as shown in Fig. 2 is 1/8" and a satisfactory mastic material having electrical conductivity is now well known and sold commercially on the market.

Another acceptable setting bed or underlayment 14 is shown in Fig. 3 and comprises one part Portland cement, 3 parts of clean mason sand, and .0275 part of a standard acetylene black carbon material, all parts of such setting bed materials being measured by weight. In the best practice we apply a dust coat 15 not to exceed 1/16" in thickness and comprising Portland cement with Shawinigan acetylene carbon black .0275 part by wt. Such a thin dust coat may, if desired, be applied on the setting bed 14 or the sheets of tile may be buttered with this coat and then laid upon the setting or supporting bed 14. Said setting bed or underlayment 14 is in the embodiment shown in Fig. 3 installed or laid over a roughened concrete subfloor 16.

A similar standard practice may be followed in setting tile in conductive beds over supporting steel, wood and roughened concrete sub-floors or the like.

When setting our electrically-conductive tile in Portland cement with sand and carbon black, we preferably keep thickness of the layer 14 to a practical minimum which good practice indicates should be a minimum of one inch. In this embodiment of our invention, the said tile units are beaten or pressed into the underlayment or setting bed for proper adhesion or contact and a joint filler or grout 18 may be employed comprising Portland cement alone or Portland cement with a waterproofing admixture or a suitably prepared grout or the like.

When using the prepared material 12 shown in Fig. 2, the best practice is to use a joint filler 19 of the same material as the mastic 12.

The size of our electrically-conductive tile units is limited only by production limitations, but we prefer to employ a tile unit which is 1 9/16" by 1 9/16" by 1/4" thick and the width and depth of the joint 17 between tile units is not especially limited, but in good practice the width of the joints should be kept to a practical minimum of 1/16".

From the above it will be seen that we are enabled to produce an electrically-conductive ceramic tile unit and floor composed thereof which have all the characteristics or properties required to successfully solve the problem of keeping the operating rooms of hospitals and also electrical and other laboratories and the like free from the generation and/or discharge therein of static electricity with consequent accidents resulting therefrom.

It will be understood also that a conductive ceramic floor composed of tile units of conductive material such as hereinabove specified may be employed with an underlayment or a setting bed of non-conductive material provided that a conductive material is used in the joints between such tile units and such joint-material so used is so arranged as to provide the required conductivity.

It will also be understood that a conductive floor per se may be formed which is composed of materials similar to those comprising the said tile units, viz., a quantity of ferrosoferric oxide ($Fe_3O_4$) amounting to between 25% and 60% of the flooring ingredients with a balancing amount of a suitable clay, or with a balancing amount of a suitable clay and a spar, and preferably such a conductive floor will be composed of substantially 31% of ferrosoferric oxide ($Fe_3O_4$) in combination with a balancing amount of a suitable clay or clays such as hereinabove specified and also preferably with a suitable spar such as also hereinabove specified.

Having described our invention, we claim:

1. A conductive ceramic floor-tile unit comprising a tile body composed of a plurality of earthen materials that are hardened by firing under a suitable temperature and comprising a quantity of ferrosoferric oxide ($Fe_3O_4$), amounting to between 29% and 60% of the tile body by weight, in combination with a balancing amount of clay suitable for use in ceramic tile manufacture.

2. A conductive ceramic floor-tile unit comprising a tile body composed of a plurality of earthen materials that are hardened by firing under a suitable temperature and comprising a quantity of ferrosoferric oxide ($Fe_3O_4$), amounting to between 29% and 60% of the tile body by weight, in combination with a balancing amount of clay and a ceramic flux suitable for use in ceramic tile manufacture.

3. A conductive ceramic floor-tile unit of the type specified in claim 2 in which the tile body is composed of 31% of ferrosoferric oxide ($Fe_3O_4$) in combination with 69% of clays and a ceramic flux suitable for use in ceramic tile manufacture.

4. A conductive ceramic floor-tile unit comprising a tile body composed of a plurality of earthen materials that are hardened by firing under a suitable temperature and composed of 31% by weight of ferrosoferric oxide ($Fe_3O_4$) in combination with 69% by weight of suitable clays and a spar comprising a ceramic flux suitable for use in ceramic tile manufacture.

5. A conductive ceramic floor-tile unit comprising a tile body composed of a plurality of earthen materials that are capable of being hardened by firing under suitable temperatures used in burning ceramic tile units and comprising 31% by weight of ferrosoferric oxide ($Fe_3O_4$) in combination with suitable clays comprising 23.3% by weight of stoneware clay, 23.3% by weight of ball clay and 22.4% by weight of a spar suitable for use in ceramic tile maufacture.

6. A conductive ceramic floor-tile unit comprising a tile body composed of a plurality of earthen materials that are capable of being hardened by firing under suitable temperatures used in burning ceramic tile units and comprising ferrosoferric oxide ($Fe_3O_4$) amounting to substantially 31% and 69% by weight of clays and a flux suitable for use in tile manufacture, said tile unit being substantially impervious to water and having an absorption factor of less than 1%.

7. A conductive ceramic floor comprising earthen materials comprising a quantity of ferrosoferric oxide ($Fe_3O_4$) amounting to between 29% and 60% by weight of the floor material with a balancing amount of a suitable clay.

8. A conductive ceramic floor composed of conductive ceramic floor-tile units laid in a setting bed of suitable conductive material, each tile unit comprising a tile body of earthen materials that are hardened by firing under suitable temperature and embodying a quantity of ferrosoferric oxide ($Fe_3O_4$) amounting to between 29% and 60% by weight of the tile body in combination with a suitable compensatory amount of a conventional clay and a spar used in the ceramic tile industry.

9. A conductive ceramic floor composed of conductive ceramic floor-tile units laid in a setting bed of suitable conductive material comprising a mixture of Portland cement with sand and carbon black, each tile unit comprising a tile body composed of earthen materials that are hardened by firing under suitable temperature and embodying a quantity of ferrosoferric oxide ($Fe_3O_4$) amounting to between 29% and 60% by weight of the tile body in combination with a suitable compensatory amount of a conventional clay used in the ceramic tile industry and a spar also used in said industry, said tile units being pressed into the setting bed for contact and adhesion and a joint filler being applied between the tile units of waterproof cement.

References Cited in the file of this patent

UNITED STATES PATENTS

| Number | Name | Date |
|---|---|---|
| 670,465 | Baumbach | Mar. 1, 1901 |
| 1,205,056 | Stowe | Nov. 14, 1916 |
| 1,394,055 | White | Oct. 18, 1921 |
| 1,394,187 | Creighton | Oct. 18, 1921 |
| 1,715,449 | Curtis | June 4, 1929 |
| 2,358,107 | Seil | Sept. 12, 1944 |
| 2,413,610 | Donelson | Dec. 31, 1946 |
| 2,457,299 | Biemesderfer | Dec. 28, 1948 |
| 2,480,166 | Schwartzwalder et al. | Aug. 30, 1949 |
| 2,492,543 | Verwey | Dec. 27, 1949 |
| 2,590,894 | Sanborn | Apr. 1, 1952 |

FOREIGN PATENTS

| Number | Country | Date |
|---|---|---|
| 8,748 | Great Britain | Apr. 14, 1913 |
| 232,943 | Great Britain | Dec. 17, 1925 |
| 321,739 | Great Britain | Nov. 21, 1929 |
| 394,115 | Great Britain | 1933 |
| 881,191 | France | 1943 |